INVENTORS
JAY R. KATCHKA
DONALD McALLISTER
EDWARD B. SCHARER

Candor & Candor
THEIR ATTORNEYS

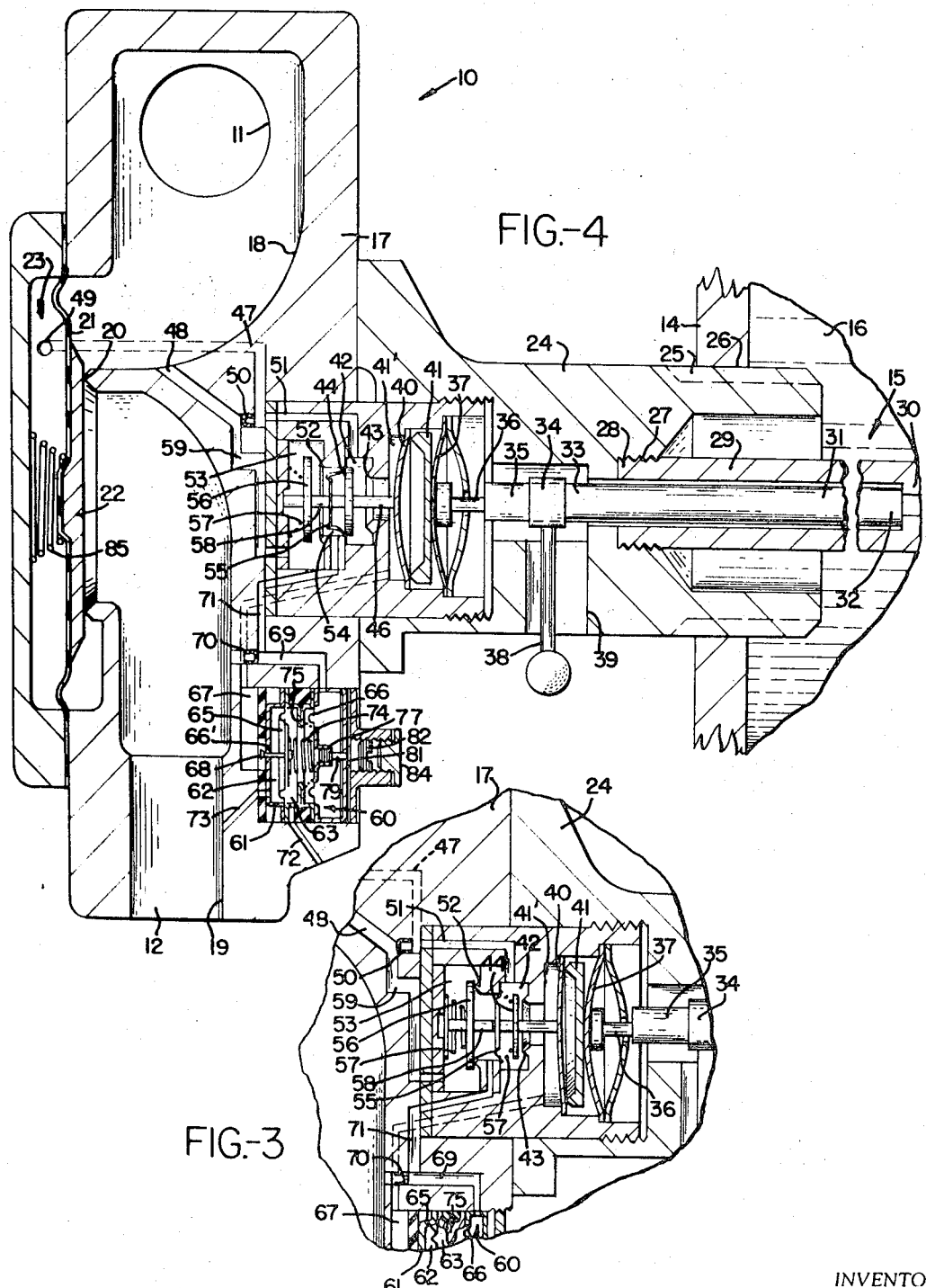

United States Patent Office 3,561,904
Patented Feb. 9, 1971

3,561,904
PRESSURE CONTROL METHOD
Jay R. Katchka, Long Beach, Donald McAllister, Palos Verdes Estates, and Edward B. Scharer, Lynwood, Calif., assignors to Robertshaw Controls Company, Richmond, Va., a corporation of Delaware
Application July 31, 1967, Ser. No. 657,152, now Patent No. 3,454,038, dated July 8, 1969, which is a division of application Ser. No. 448,201, Apr. 14, 1965, now Patent No. 3,338,517. Divided and this application Nov. 26, 1968, Ser. No. 779,001
The portion of the term of the patent subsequent to July 8, 1986, has been disclaimed
Int. Cl. F16k *31/365, 31/00*
U.S. Cl. 137—14                                   10 Claims

ABSTRACT OF THE DISCLOSURE

This disclosure relates to a control device for thermostatically supplying fuel to a burner means at one constant rate during normal demands on the burner means and for thermostatically supplying fuel to the burner means at an increased constant rate during abnormal demands on the burner means, the control device having its fuel flow rate changed by a two stage pressure sensing regulator that controls a main pressure operated valve member of the control.

---

This application is a divisional patent application of its copending patent application, Ser. No. 657,152, filed July 31, 1967 now Pat. No. 3,454,038 which, in turn, is a divisional patent application of its copending parent patent application, Ser. No. 448,201, filed Apr. 14, 1965, now Pat. No. 3,338,517, and assigned to the same assignee to whom this application is assigned.

This invention relates to an improved control device for supplying fuel or the like.

It is well known that various fuel burning apparatus or the like, such as a burner means for a domestic water heater or the like, is required to supply fuel to the burner means under normal demands on the burner means. However, it has been found that during abnormal use of the apparatus, it is desired to increase the fuel output pressure accordingly to satisfy the abnormal demand while still causing normal fuel output pressure during normal demand periods.

For example, in a water heater control device, the control device can be set to provide a normal recovery rate for the heating of the water in the water tank during normal draws of hot water therefrom. However, when abnormal draws of hot water are made on the water heater tank, the prior known control devices failed to provide an increased recovery rate for the water heater tank to compensate for the abnormal draws thereon whereby insufficient hot water was supplied during the abnormal demand periods.

Accordingly to the teachings of this invention, however, an improved control device is provided which will provide normal fuel outlet pressure to the burner means of the apparatus when a temperature responsive device senses a normal temperature drop below a selected temperature to provide a normal recovery rate for the apparatus and will provide an increased fuel outlet pressure to the burner means of the apparatus when the temperature responsive device senses an abnormal drop in temperature below the selected temperature to provide a fast recovery rate of the apparatus.

Accordingly, it is an object of this invention to provide an improved method for controlling a device having a pressure regulator means, the method of this invention having one or more of the novel features set forth above or hereinafter shown or described.

Other objects, uses and advantages of this invention are apparent from a reading of this description which proceeds with reference to the accompanying drawings forming a part thereof and wherein:

FIG. 1 is a fragmentary perspective view illustrating the improved control device of this invention being utilized for controlling the burner means of a domestic water heater tank or the like.

FIG. 3 is a fragmentary view similar to FIG. 2 and illustrates the control device in another operating position thereof.

FIG. 4 is a view similar to FIG. 2 and illustrates the control device in still another operating position thereof.

Figure 1:
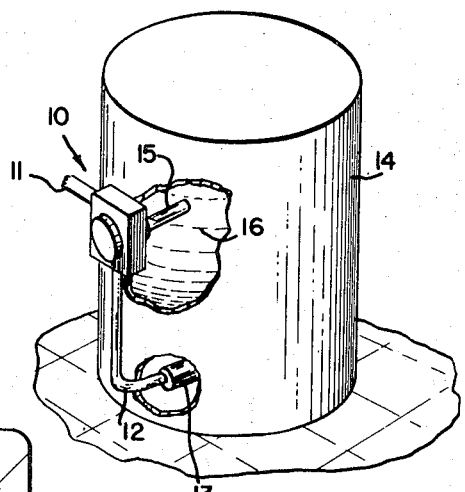

While the various features of this invention are hereinafter described and illustrated as being particularly adaptable to provide a method for controlling a domestic water heater tank or the like, it is to be understood that the various features of this invention can be utilized singly or in any combination thereof to provide a method for controlling devices for other apparatus or the like.

Therefore, this invention is not to be limited to only the embodiment illustrated in the drawings, because the drawings merely illustrate one of the variety of uses of this invention.

Referring now to FIG. 1, the improved control device of this invention is generally indicated by the reference numeral 10 and is utilized to control the flow of fuel from a fuel supply manifold 11 to an outlet conduit 12 leading to a main burner means 13 for a domestic water heater tank 14, the control device 10 having temperature sensing means 15 for sensing the temperature of the water 16 in the water heater tank 14 to control the flow of fuel to the burner means 15 in response to sensed temperature in a manner hereinafter described.

Figure 2:
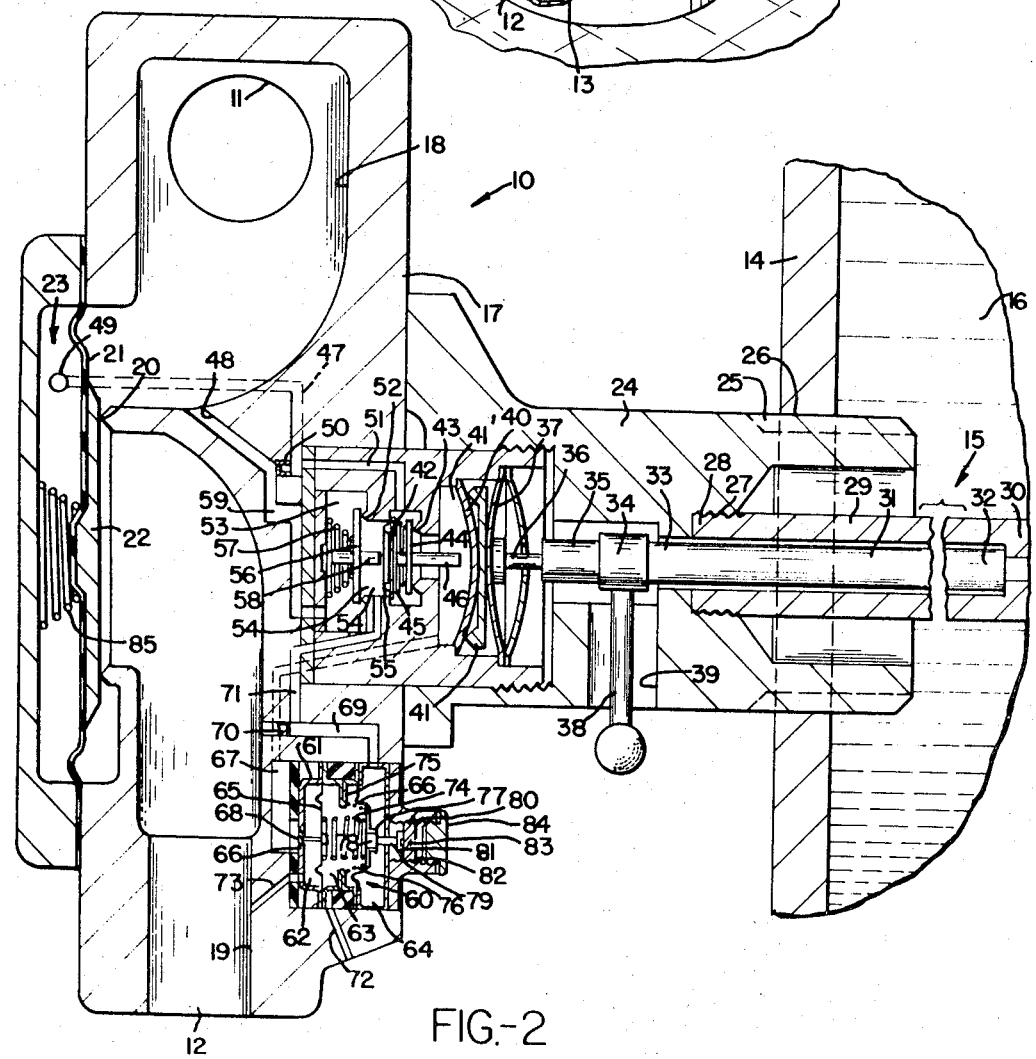
FIG. 2 is an enlarged, fragmentary, cross-sectional view illustrating the improved control device of this invention in one operating position thereof.

As illustrated in FIG. 2, the control device 10 includes a housing 17 having an inlet 18 adapted to be interconnected to the supply manifold 11 in any suitable manner. The inlet 18 of the control device 10 is separated from an outlet 19 by a valve seat 20, the outlet 19 being adapted to be interconnected to the outlet conduit 12 in any suitable manner.

A flexible diaphragm 21 is carried by the housing means 17 and carries a valve member 22 adapted to open and close the valve seat 20 in a manner hereinafter described, the flexible diaphragm 21 cooperating with the housing means 17 to define a chamber 23.

The housing means 17 has a shank portion 24 provided with an externally threaded end 25 adapted to be threadedly received in a threaded bore 26 in the water heater tank 14 to fasten the control device 10 thereto. The shank portion 24 has a threaded bore 27 receiving a threaded end 28 of a copper tube 29 having a closed end 30 whereby the tube 29 projects into the water 16 in the tank 13. An invar rod 31 is disposed in the tube 29 and has an end 32 fixed to the closed end 30 of the tube 29, the other end 33 of the rod 31 being threadedly received in a threaded bore of an adjusting member 34.

The adjusting member 34 carries an extension 35 adapted to abut against a plunger 36 engaging a flexible diaphragm 37 or the like.

The adjusting member 34 has a lever 38 interconnected thereto and passing out through a slot 39 in the shank portion 24 of the housing means 17 whereby the operator can rotate the adjusting member 34 to change its telescoping relation with the end 33 of the rod 31 for a purpose hereinafter described to select the desired temperature setting of the control device 10.

A snap action disc 40 or the like is carried by the housing means 17 and normally assumes the position illustrated in FIG. 2. A fulcrum member 41 is disposed between the snap action disc 30 and the flexible diaphragm 37 to flex the snap action disc 40 as the plunger 36 is moved to the left in a manner hereinafter described.

The snap action member 40 is disposed in a chamber 41' of the housing means 17, the chamber 41' being separated from another chamber 42 by a valve seat 43.

The valve seat 43 is opened and closed by a valve member 44 normally urged against the valve seat 43 by a compression spring 45. The valve member 44 has a stem 46 passing through the valve seat 43 and adapted to be engaged by the snap action member 40 when the same is snapped over center in the manner illustrated in FIG. 3 to open the valve seat 43 for a purpose hereinafter described.

A passage means 47 is formed in the housing means 17 and has an inlet end 48 in communication with the inlet 18 and an outlet end 49 in communication with the chamber 23. However, a restriction or orifice means 50 is disposed in the passage means 47 between the inlet end 48 and the outlet end 49 thereof for a purpose hereinafter described.

Another passage means 51 is formed in the housing means 17 and interconnects the passage 47 to the chamber 42 at a point downstream from the orifice 60.

Another valve seat 52 is formed in the housing means 17 and separates a chamber 53 from a chamber 54, the chamber 54 being separated from the chamber 42 by a flexible diaphragm 55. The valve seat 52 is adapted to be opened and closed by a valve member 56 normally urged to the closed position by a compression spring 57. The valve member 56 carries a stem 58 adapted to be engaged by the diaphragm 55 to move the valve member 56 to the open position as illustrated in FIG. 4 when the snap action disc member 40 is further flexed beyond its over center position by the thermostat means 15 in a manner hereinafter described.

The chamber 53 is interconnected to the passage means 47 at a point upstream from the orifice means 50 by a passage means 59.

A regulator 60 is carried by the housing means 70 and includes a casing means 61 separated into three chambers 62, 63, and 64 by a pair of flexible diaphragms 65 and 66 carried by the casing means 61. A valve seat 66' is formed in the casing 61 and interconnects the chamber 62 with a passage means 67 leading to the chamber 41' previously described.

The diaphragm 65 carries a valve member 68 which is adapted to open and close the valve seat 66', the valve member 68 being disposed on the side of the valve seat 66' opposite to the diaphragm 65.

The chamber 64 of the regulator 60 is interconnected to the outlet 19 by a passage means 69, the passage means having a restriction or orifice means 70 disposed therein. The passage 69 is also interconnected to the chamber 54 by passage means 71 communicating with the passage 69 at a point downstream from the orifice means 70 for a purpose hereinafter described.

The chamber 63 of the regulator 60 is interconnected to the atmosphere by a vent passage means 72. The chamber 62 of the regulator 60 is also interconnected to the outlet 19 by a passage means 73.

A compression spring 74 is disposed between the diaphragms 65 and 66 of the regulator 60. In addition, the casing means 61 define an annular shoulder 75 in the chamber 63 whereby another compression spring 76 is disposed between the shoulder 75 and the diaphragm 66 for a purpose hereinafter described.

The diaphragm 66 of the regulator 60 has a threaded bore 77 receiving a threaded stem 78 having a reduced portion 79 passing through an aperture 80 in the casing means 61, the stem 78 having an enlarged head 81 disposed outboard of the casing means 61 for a purpose hereinafter described.

The housing means 17 has a threaded bore 82 loosely receiving the end 81 of the adjusting member 78 and threadedly receiving a threaded member 83 for a purpose hereinafter described. The end of the threaded bore 82 is closed by a cap member 84.

Therefore, it can be seen that the control device 10 of this invention can be simply formed to provide normal recovery rate for the water heater tank 14 during normal draws of hot water therefrom and to provide increased recovery rate for the water heater tank 14 during abnormal draws of hot water therefrom.

In particular, the operation of the control device 10 is as follows.

The operator moves the lever 38 of the adjusting member 34 to adjust the same to the desired temperature setting at which the control device 10 is to maintain the temperature of the water 16 in the water heater tank 14.

Assuming that the temperature of the water in the water heat tank 16 is at the selected temperature or above, the control device 10 is in the position illustrated in FIG. 2 whereby the valve members 44 and 56 are closed and the main valve member 22 is disposed against the valve seat 20 because the pressure in the inlet 18 and in the chamber 23 is equalized so that the force of a compression spring 85 disposed in the chamber 23 will hold the valve member 22 against the valve seat 20 so that no fuel can flow from the inlet 18 to the outlet 19.

However, should the temperature of the water 16 fall below the selected temperature a certain amount, such as being caused by a normal draw of hot water 16 from the tank 14, the tube 29 contracts causing the rod 33 to move to the left and, thus, move the plunger 36 to the left to snap the snap action disc 40 over center and open the valve seat 43 in the manner illustrated in FIG. 3. With the valve member 44 now in the open position, the chamber 23 is vented to the outlet 19 by means of the passage 47, passage 51, chamber 42, chamber 41', passage 67, open valve seat 66', chamber 62 and passage 73 whereby the orifice 50 in the passage means 47 maintains a pressure drop across the same so that the pressure of the fuel in the inlet 18 can move the valve member 22 away from the valve seat 20. In this manner, fuel can flow to the outlet 19 and, thus, to the burner means 13 to be ignited by suitable pilot means.

As the fuel pressure builds up in the outlet 19 because of the open valve seat 20, the pressure in the outlet 19 feeds back through the passage 73 to the chamber 62 of the regulator 60 and acts on the diaphragm 65 in opposition to the force of the compression spring 74 to regulate the opening and closing of the valve seat 66' and, thus, the pressure in the chamber 23 so that the pressure in the outlet 19 will be at a set pressure when the valve member 44 is opened.

In particular, the force of the compression spring 76 of the regulator 60 urges the diaphragm 66 to the right until the member 81 strikes against the adjusting member 83 so that the compression spring 74 will have a fixed force tending to move the valve member 68 to its open position. In order to change the setting for the regulator 60 when the valve member 44 is opened, the member 83 can be adjusted in the threaded bore 82.

Thus, it can be seen that as long as the temperature drop of the water 16 in the water heater tank 14 is a predetermined amount below the temperature set by the lever 38, the control device 10 will provide a normal or minimum regulated fuel outlet pressure to the burner means 13 so that the burner means 13 will provide a normal recovery rate for the water heater tank 14.

As the temperature of the water increases, the tube 29 expands and moves the rod 31 back to the right whereby the snap action disc 40 can snap back to the position illustrated in FIG. 2 to close the valve member 44 against the valve seat 43 so that the chamber 23 is no longer vented to the outlet 19. As the orifice 50 in the passage means 47 again provides pressure in the chamber 23 equal to the pressure in the inlet 18, the compression spring 85 moves the valve member 22 to close the valve seat 20 and, thus, terminate the supply of fuel to the main burner 13.

Thus, the control device 10 is adapted to supply a regulated fuel pressure to the burner means 13 when the temperature responsive means 15 only senses a normal temperature drop of the water 16 below the temperature selected by the lever 38.

If, however, the temperature drop of the water 16 below the selected temperature be an abnormal amount, such as during abnormal hot water draws on the water heater tank 14, the tube 29 of the temperature responsive device 15 not only contracts an amount sufficient to snap the snap action disc 40 over center and open the valve member 44, but also further flexes the disc 44 in the manner illustrated in FIG. 4 to open the valve seat 52.

Figure 5:
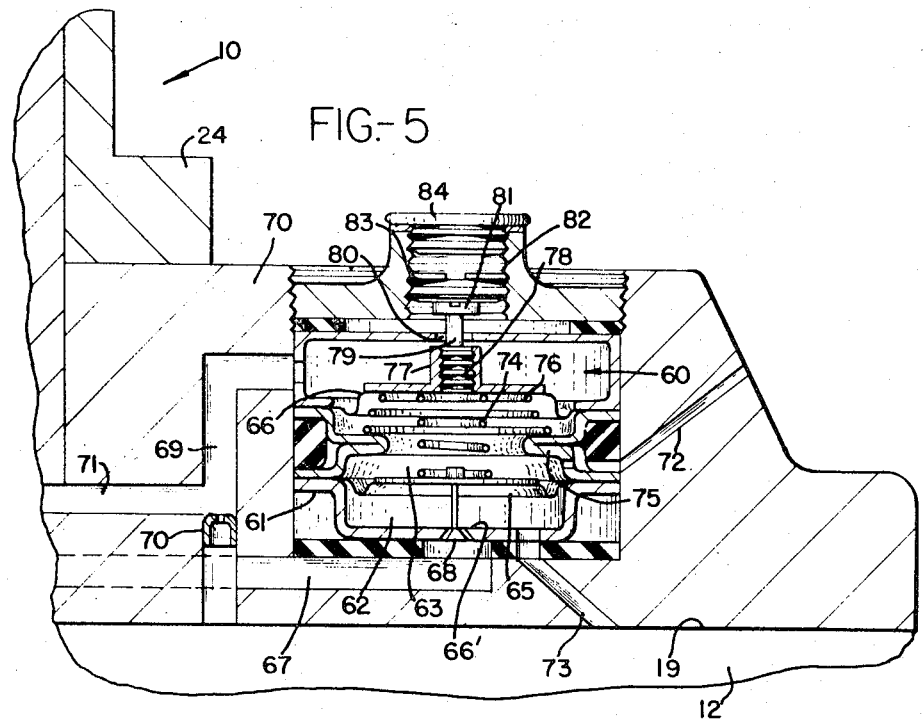
FIG. 5 is an enlarged, fragmentary, cross-sectional view of the regulator for the control device of this invention.
Figure 6:
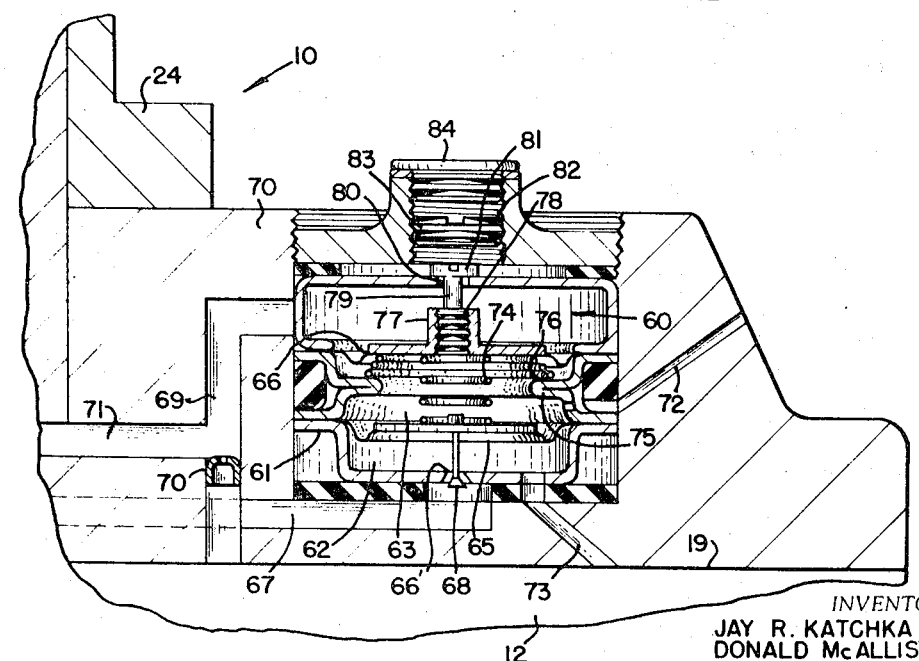
FIG. 6 is a view similar to FIG. 5 and illustrates the regulator in another operating position thereof.

In this manner, the inlet fuel pressure is adapted to pass through the passage means 47, passage means 59, chamber 53, opened valve seat 52, chamber 54, passage 71, and passage 69 into the chamber 64 of the regulator 60 to urge the diaphragm 66 toward the diaphragm 65 in the manner illustrated in FIG. 6 until the button end 81 of the stem member 78 abuts against the casing 61 whereby the force of the compression spring 74 acting on the diaphragm 65 is increased so that the regulator 60 will vent the chamber 23 at a greater rate than when the regulator was disposed in the position illustrated in FIG. 5. In this manner, the valve member 22 will maintain a fuel outlet pressure in the outlet 19 at a maximum rate so that the burner means 13 will heat the water 16 at a greater rate than when only the valve member 34 was opened in the manner previously described.

In order to adjust the maximum setting for the regulator 60, the stem member 78 can be adjusted relative to the threaded bore 74.

As the temperature of the water 16 in the water heater tank 14 increases, the tube 29 of the temperature responsive device 15 expands and moves the rod 31 back to the right to permit the valve member 56 to close whereby the fuel pressure in the chamber 64 is adapted to decrease by means of the orifice means 70 so that the spring 76 can again return the diaphragm 66 to the position illustrated in FIG. 5. In this manner, the regulator 60 will increase the pressure in the chamber 23 to reduce the fuel outlet pressure in the outlet 19 to the minimum rate previously described.

Thereafter, should the temperature of the water 16 increase to the selected temperature, the valve member 44 will close and the valve member 22 will subsequently close in the manner previously described.

Therefore, it can be seen that when an abnormal demand is made on the water heater tank 14, such as during washing machine use and the like, the temperature responsive device 15 causes a changing in the setting of the regulator 60 to provide a maximum fuel outlet pressure in the outlet 19 so that the burner means 13 will have an increased recovery rate. However, during normal demands on the water heater tank 14, such as during basin use and the like, the temperature responsive means 15 maintains the regulator 60 at its minimum setting to provide a normal or minimum fuel outlet pressure in the outlet 19 for normal recovery rates of the burner means 13.

While the control device 10 has been previously described for use with a water heater tank, such a control device 10 would be equally applicable to a heating control system with the valves 44 and 56 under the control of a room thermostat or thermostats sensing the air temperature to be controlled.

Accordingly, it can be seen that this invention provides an improved method having many novel features.

What is claimed is:

1. A method for controlling a pressure regulator means having an inlet and an outlet interconnected together by a valve seat means controlled by a valve member operated by a first flexible diaphragm that cooperates with a housing means of the pressure regulator to define a chamber directly interconnected to one of said inlet and said outlet and interconnected to the other of said inlet and said outlet by said valve seat means, said method comprising the steps of urging said first diaphragm to move said valve member in one direction relative to said valve seat means by a spring means, controlling the urging force of said spring means by a second flexible diaphragm operable between a first position thereof that provides a first urging force on said first diaphragm and a second position thereof that provides a second urging force on said first diaphragm, and adjusting one of said positions of said second diaphragm to change the urging force on said first diaphragm for that particular position of said second diaphragm.

2. A method as set forth in claim 1 wherein said adjusting step comprises the step of adjusting both of said positions of said second diaphragm.

3. A method as set forth in claim 1 and including the step of moving said second diaphragm between its said positions by changing the fluid pressure acting across said second diaphragm.

4. A method as set forth in claim 3 wherein said step of moving said second diaphragm between its said positions comprises the step of directing fluid pressure against one side of said second diaphragm.

5. A method as set forth in claim 1 and including the step of venting the space between said diaphragms to the atmosphere.

6. A method for controlling a pressure operated diaphragm valve means that cooperates with a valve seat that interconnects an inlet with an outlet, said diaphragm valve means cooperating with the housing to define a chamber, said method comprising the steps of interconnecting said inlet with said chamber so that the pressure in said chamber acting on said diaphragm valve means determines the degree of interconnection between said inlet and said outlet at said valve seat, interconnecting said chamber to an inlet means of pressure sensing regulator, interconnecting the outlet means of said regulator to said outlet, said inlet means and said outlet means being interconnected together by a valve seat means controlled by a valve member operated by a first diaphragm that cooperates with said housing means to define a first chamber means directly interconnected to one of said inlet means and said outlet means and interconnected to the other of said inlet means and said outlet means by said valve seat means, urging said first diaphragm to move said valve member in one direction relative to said valve seat means by a spring means, controlling the urging force of said spring means by a second flexible diaphragm operable between a first position thereof that provides a first urging force to maintain a first pressure rate in said outlet and a second position thereof that provides a second urging force to maintain a second pressure rate in said outlet, and adjusting one of said positions of said second diaphragm to change the urging force and, thus, the pressure rate in said outlet for that particular position of said second diaphragm.

7. A method as set forth in claim 6 wherein said adjusting step comprises the step of adjusting both of said positions of said second diaphragm.

8. A method as set forth in claim 6 and including the step of moving said second diaphragm between its said positions by changing the fluid pressure acting across said second diaphragm.

9. A method as set forth in claim 8 wherein said step of moving said second diaphragm between its said positions comprises the step of directing fluid pressure against one side of said second diaphragm.

10. A method as set forth in claim 6 and including the step of venting the space between said diaphragms to the atmosphere.

References Cited

UNITED STATES PATENTS 3,454,038   7/1969   Katchka et al. _____ 137—489

ALAN COHAN, Primary Examiner

U.S. Cl. X.R.

137—489, 505.41